US009913231B2

(12) United States Patent
Do et al.

(10) Patent No.: US 9,913,231 B2
(45) Date of Patent: Mar. 6, 2018

(54) LOCAL TRANSMITTER SYNCHRONIZATION BASED ON WWAN BASE STATION NETWORK

(71) Applicant: Qualcomm Incorporated, San Diego, CA (US)

(72) Inventors: Ju-Yong Do, Palo Alto, CA (US); Benjamin Werner, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 159 days.

(21) Appl. No.: 14/817,557

(22) Filed: Aug. 4, 2015

(65) Prior Publication Data
US 2017/0041890 A1    Feb. 9, 2017

(51) Int. Cl.
*H04W 56/00* (2009.01)
*H04W 64/00* (2009.01)
(Continued)

(52) U.S. Cl.
CPC ........ *H04W 56/001* (2013.01); *H04B 7/2687* (2013.01); *H04W 56/0015* (2013.01);
(Continued)

(58) Field of Classification Search
CPC combination set(s) only.
See application file for complete search history.

(56) References Cited

U.S. PATENT DOCUMENTS 6,847,826 B1 * 1/2005 Wesby .................. H04J 3/0652
455/502
7,565,147 B2 * 7/2009 Simons ................. G01S 5/0205
342/357.31

(Continued)

FOREIGN PATENT DOCUMENTS

WO    WO 0180461 A1    10/2001
WO    2011063044 A1    5/2011

OTHER PUBLICATIONS

International Search Report and Written Opinion—PCT/US2016/037945—ISA/EPO—Oct. 7, 2016.

*Primary Examiner* — Yee Lam
(74) *Attorney, Agent, or Firm* — BSTZ

(57) ABSTRACT

Disclosed is a method and apparatus for correcting clocks for a plurality of local transmitters. In one embodiment, the functions implemented include: receiving base station time from a plurality of local transmitters; assigning each local transmitter of the plurality of local transmitters to at least one subset of a plurality of subsets, wherein each subset corresponds to a single base station, and wherein each local transmitter in a particular subset receives time from a base station corresponding to the subset; selecting a single subset of local transmitters as a reference subset of local transmitters, the reference subset corresponding to a reference base station, each non-reference subset corresponding to a non-reference base station; determining a time difference between the reference base station and each of the non-reference base stations based on time received from one or more local transmitters that belong in more than one of the subsets; and transmitting the time difference to respective non-reference subsets of local transmitters.

30 Claims, 7 Drawing Sheets

(51) Int. Cl.
*H04W 72/04* (2009.01)
*H04W 84/04* (2009.01)
*H04B 7/26* (2006.01)

(52) U.S. Cl.
CPC ....... *H04W 56/0065* (2013.01); *H04W 64/00* (2013.01); *H04W 72/044* (2013.01); *H04W 84/04* (2013.01)

(56) References Cited

U.S. PATENT DOCUMENTS

| | | | |
|---|---|---|---|
| 2002/0114303 A1* | 8/2002 | Crosbie | H04B 7/269 370/338 |
| 2005/0037786 A1* | 2/2005 | Edge | H04W 56/002 455/502 |
| 2008/0248741 A1 | 10/2008 | Alizadeh-Shabdiz | |
| 2009/0290511 A1 | 11/2009 | Budampati et al. | |
| 2010/0271263 A1 | 10/2010 | Moshfeghi | |
| 2011/0207472 A1 | 8/2011 | Abraham et al. | |
| 2012/0120892 A1 | 5/2012 | Freda et al. | |
| 2012/0165012 A1* | 6/2012 | Fischer | G01S 5/0242 455/435.1 |
| 2012/0195256 A1 | 8/2012 | Khoury | |
| 2013/0235864 A1 | 9/2013 | Do et al. | |
| 2013/0244653 A1 | 9/2013 | Song et al. | |
| 2013/0281080 A1 | 10/2013 | Carmon | |
| 2014/0045522 A1 | 2/2014 | Sugar et al. | |
| 2014/0141779 A1 | 5/2014 | Yuk et al. | |

* cited by examiner

LOCAL TRANSMITTER SYNCHRONIZATION BASED ON WWAN BASE STATION NETWORK

FIELD

The subject matter disclosed herein relates to electronic devices and, more particularly, to methods and apparatuses for determining a position of a device in an indoor venue.

BACKGROUND

Positioning a mobile device, such as a smart phone, in an indoor venue may be useful in many use scenarios. For example, merchants in an indoor mall may send targeted marketing information to nearby mobile devices based on the position information of the mobile devices. As another example, the position information of mobile devices in an indoor venue may greatly aid search and rescue missions.

Time-of-Arrival (TOA) measurements-based trilateration techniques may be utilized to determine the position of a mobile device. A plurality of local transmitters whose locations are known may transmit positioning beacon signals including information identifying the transmitting local transmitter and indicating the time of transmission. Much like the way the Global Positioning System (GPS) works, a receiver device, such as a mobile device, may determine its position based on TOA measurements of the received positioning beacon signals and the known positions of the local transmitters using trilateration techniques.

Unlike some other types of positioning systems such as a Round-Trip-Time (RTT) measurements-based positioning system, a TOA-based positioning system has the advantage of being scalable. In other words, because the local transmitters in a TOA-based positioning system merely broadcast signals indicating their identity and the time of transmission, an increase in the number of receiver devices does not increase the workload of the local transmitters. Thus, a TOA-based positioning system may theoretically support an unlimited number of receiver devices.

For a TOA-based positioning system to work, the clocks of the local transmitters need to be almost perfectly synchronized. It has been suggested that the increasingly ubiquitous wireless local area network (WLAN) access points (e.g., wireless network devices that provide wireless network service in accordance with one or more IEEE 802.11 protocols on the industrial, scientific, and medical "ISM" radio frequency bands) may double as local transmitters for indoor positioning applications. The clock of a conventional WLAN access point is, however, generally of a poor quality. The clocks of a plurality of WLAN access points are unlikely to remain synchronized for long without very frequent resynchronization.

SUMMARY

An embodiment disclosed herein may include a method for synchronizing clocks of a plurality of local transmitters implemented at a server. According to an exemplary method, base station time is received from a plurality of local transmitters. In one embodiment, each local transmitter of the plurality of local transmitters is assigned to at least one subset of a plurality of subsets, wherein each subset corresponds to a single base station, and wherein each local transmitter in a particular subset receives time from a base station corresponding to the subset. In one embodiment, a single subset of local transmitters is selected as a reference subset of local transmitters, the reference subset corresponding to a reference base station, each non-reference subset corresponding to a non-reference base station. In one embodiment, a time difference between the reference base station and each of the non-reference base stations is determined based on time received from one or more local transmitters that belong in more than one of the subsets, and the time difference is transmitted to respective non-reference subsets of local transmitters.

Another embodiment disclosed herein may include a server for synchronizing clocks of a plurality of local transmitters. An exemplary server can include a memory, and a processor coupled to the memory. In one embodiment, the processor can be configured to receive base station time from a plurality of local transmitters. In one embodiment, the processor may also be configured to assign each local transmitter of the plurality of local transmitters to at least one subset of a plurality of subsets, wherein each subset corresponds to a single base station, and wherein each local transmitter in a particular subset receives time from a base station corresponding to the subset. In one embodiment, the processor may further be configured to select a single subset of local transmitters as a reference subset of local transmitters, the reference subset corresponding to a reference base station, each non-reference subset corresponding to a non-reference base station In one embodiment, the processor may also be configured to determine a time difference between the reference base station and each of the non-reference base stations based on time received from one or more local transmitters that belong in more than one of the subsets, and transmit the time difference to respective non-reference subsets of local transmitters.

A further embodiment disclosed herein may include a server for synchronizing clocks of a plurality of local transmitters. In an exemplary embodiment, the server includes means for receiving base station time from a plurality of local transmitters. In one embodiment, the server also includes means for assigning each local transmitter of the plurality of local transmitters to at least one subset of a plurality of subsets, wherein each subset corresponds to a single base station, and wherein each local transmitter in a particular subset receives time from a base station corresponding to the subset. In one embodiment, the server further includes means for selecting a single subset of local transmitters as a reference subset of local transmitters, the reference subset corresponding to a reference base station, each non-reference subset corresponding to a non-reference base station. Furthermore, in one embodiment, the server includes means for determining a time difference between the reference base station and each of the non-reference base stations based on time received from one or more local transmitters that belong in more than one of the subsets, and means for transmitting the time difference to respective non-reference subsets of local transmitters.

An additional embodiment disclosed herein may include a non-transitory, computer-readable, storage medium storing computer executable code for synchronizing clocks of a plurality of local transmitters, which when executed by a computing system, causes the computing system to perform a method. In an exemplary method caused by execution of the code, the base station time is received from a plurality of local transmitters. In one embodiment, each local transmitter of the plurality of local transmitters is assigned to at least one subset of a plurality of subsets, wherein each subset corresponds to a single base station, and wherein each local transmitter in a particular subset receives time from a base station corresponding to the subset. In one embodiment, a single subset of local transmitters is selected as a reference subset of local transmitters, the reference subset corresponding to a reference base station, each non-reference subset corresponding to a non-reference base station. In one embodiment, a time difference between the reference base station and each of the non-reference base stations is determined based on time received from one or more local transmitters that belong in more than one of the subsets, and the time difference is transmitted to respective non-reference subsets of local transmitters.

DETAILED DESCRIPTION

Embodiments of the disclosure relate to a TOA-based indoor positioning system including a plurality of local transmitters. In embodiments discussed herein, the clocks of the local transmitters are synchronized and re-synchronized based on time information included in wireless wide area network (WWAN) signals transmitted by nearby WWAN base stations and received by the local transmitters. The local transmitters may, in some embodiments, be WLAN access points, Bluetooth beacons, or any other device capable of receiving, transmitting, and processing wireless signals in accordance with the discussion herein. In one embodiment, local transmitters may transmit timing signals a shorter distance than WWAN base stations, such as transmission of the signals within a venue, physical structure, or other limited physical space. Such local transmitters may include suitable hardware including but not limited to WWAN modems capable of receiving WWAN signals and decoding at least the time contained in the WWAN signals. Some such local transmitters may include the abovementioned additional WWAN-related hardware to be able to operate further as femtocells. Hereinafter, a WWAN may refer to one of a Global System for Mobile Communications (GSM) network, a Code Division Multiple Access (CDMA) network, a Universal Mobile Telecommunications System (UMTS) network, a CDMA2000 network, a Long-Term Evolution (LTE) network, an LTE Advanced network, other similar cellular mobile networks, or combinations thereof. A WWAN base station, as discussed herein, is a WWAN network entity that provides wireless access service in a WWAN.

Figure 1:
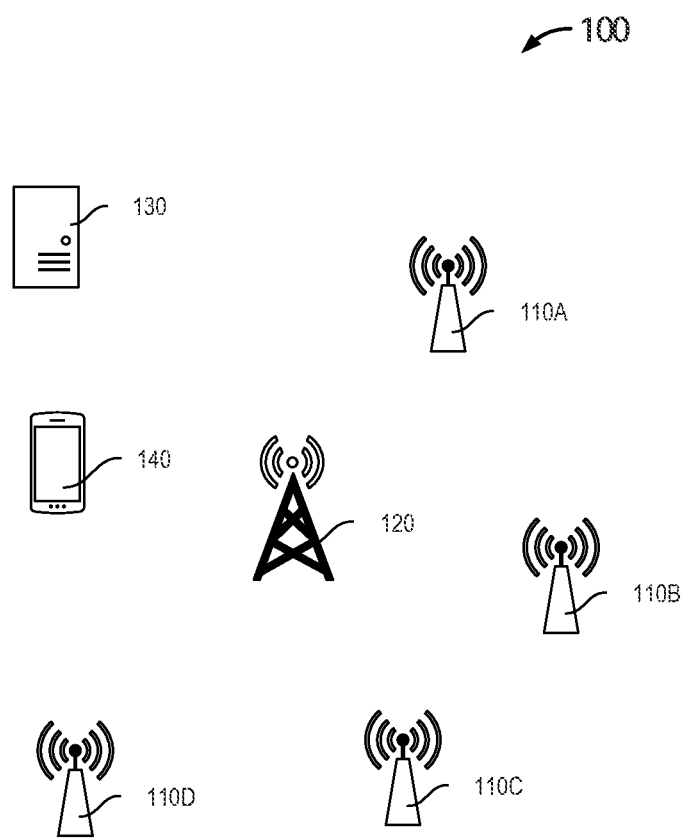
FIG. 1 illustrates an example environment in which embodiments of the disclosure may be practiced.

Referring to FIG. 1, an example environment 100 in which embodiments of the disclosure may be practiced is shown. Local transmitters 110A-D may periodically transmit positioning beacon signals, where each positioning beacon signal includes information relating to the identity of the transmitting local transmitter and the time of transmission. Local transmitters 110A-D may be capable of receiving WWAN signals transmitted by a WWAN base station 120 and decoding the time in the WWAN signals. Therefore, each local transmitter 110 may periodically recalibrate its own clock based on the time information in received WWAN signals. The recalibration process may be performed at each local transmitter 110 as frequently as needed to keep clocks of the local transmitters 110A-D sufficiently synchronized for the purposes of TOA-based positioning techniques. It should be appreciated that although local transmitters 110 A-D may synchronize their clocks to a time server on a network, the time server-based clock synchronization may not be sufficiently accurate for the purpose of TOA-based positioning.

A receiver device 140, such as a mobile device as illustrated, may receive positioning beacon signals transmitted by a plurality of the local transmitters 110A-D. In one embodiment, the receiver device 140 may then perform a TOA-based trilateration process to determine its own location based at least in part on the received positioning beacon signals. The receiver device 140 may be a mobile device, such as a wireless device, cell phone, personal digital assistant, mobile computer, tablet, head-mounted display (HMD), wearable device, personal computer, laptop computer, or any type of device capable of receiving, transmitting, and processing the signals discussed herein.

In some embodiments, the receiver device 140 may decode the local transmitter identity and time information in the received positioning beacon signals, and offload the information to a separate position-determination entity, such as a server 130, through a suitable data link for trilateration processing. The receiver device 140 may then receive its position as determined by the server 130.

As described above, positions of the local transmitters 110A-D are utilized in the determination of the position of the receiver device 140. The positions of the local transmitters 110 may be preconfigured within the receiver device 140, or may be stored in the server 130 for retrieval by the receiver device 140 through a suitable data link as needed. The positions of the local transmitters 110A-D, and the local transmitter identity information included in the positioning beacon signals, may be correlated so that the position of a particular local transmitter may be determined based on the decoded local transmitter identity information. The positions of the local transmitters 110A-D may also be stored in the server 130, in embodiments where the server 130 is utilized to perform trilateration-related operations. In some further embodiments, the local transmitter identity information included in the positioning beacon signals may comprise the positions of the transmitting local transmitter 110 so that the positions of local transmitters 110 need not be preconfigured in the receiver device 140 or in the server 130. It should be appreciated that FIG. 1 is illustrative, and the disclosure is not limited by the number of local transmitters, receiver devices, or servers shown in FIG. 1. Furthermore, various functions of the server 130 may be performed by single physical server, or may be divided up and performed by a plurality of physical servers. If two or more servers are utilized, the servers may or may not be collocated. Suitable data links may be provided between any two devices that need to engage in information exchange, even though FIG. 1 does not show the data links.

In some embodiments, the calibration of a clock of a local transmitter 110 may comprise time offset calibration. In some other embodiments, the calibration of a clock of a local transmitter 110 may comprise both time offset calibration and frequency offset calibration. Herein, time offset calibration may refer to an update of the current time as maintained by the clock of the local transmitter 110, such that the clock of the local transmitter 110 and the clock of the WWAN base station 120 indicate the same current time. To perform time offset calibration, in some embodiments, a local transmitter 110 may update the current time on its clock to match the current time on the clock of the WWAN base station 120 based on the decoded time that is included in a WWAN signal received from WWAN base station 120, while taking into account the time period it takes for the WWAN signal to propagate from the WWAN base station 120 to the local transmitter 110 (e.g., time of flight correction). This time of flight, or propagation time, may be calculated based on the distance between the local transmitter 110 and the WWAN base station 120, which can be determined based on the position of the local transmitter 110 and the position of the WWAN base station 120. These positions may be preconfigured within the local transmitter 110, or may be retrieved from the server 130 by the local transmitter 110 through a suitable data link. In some embodiments, the position of the transmitting WWAN base station may be included in WWAN signals.

Frequency offset calibration may refer to an update of the speed of the clock of the local transmitter 110. Frequency offset calibration can be utilized to ensure that the clock of the local transmitter 110 and the clock of the WWAN base station 120 have the same speed. The local transmitter 110 may determine the frequency offset using the times in the WWAN signals received over a period of time.

Figure 2:
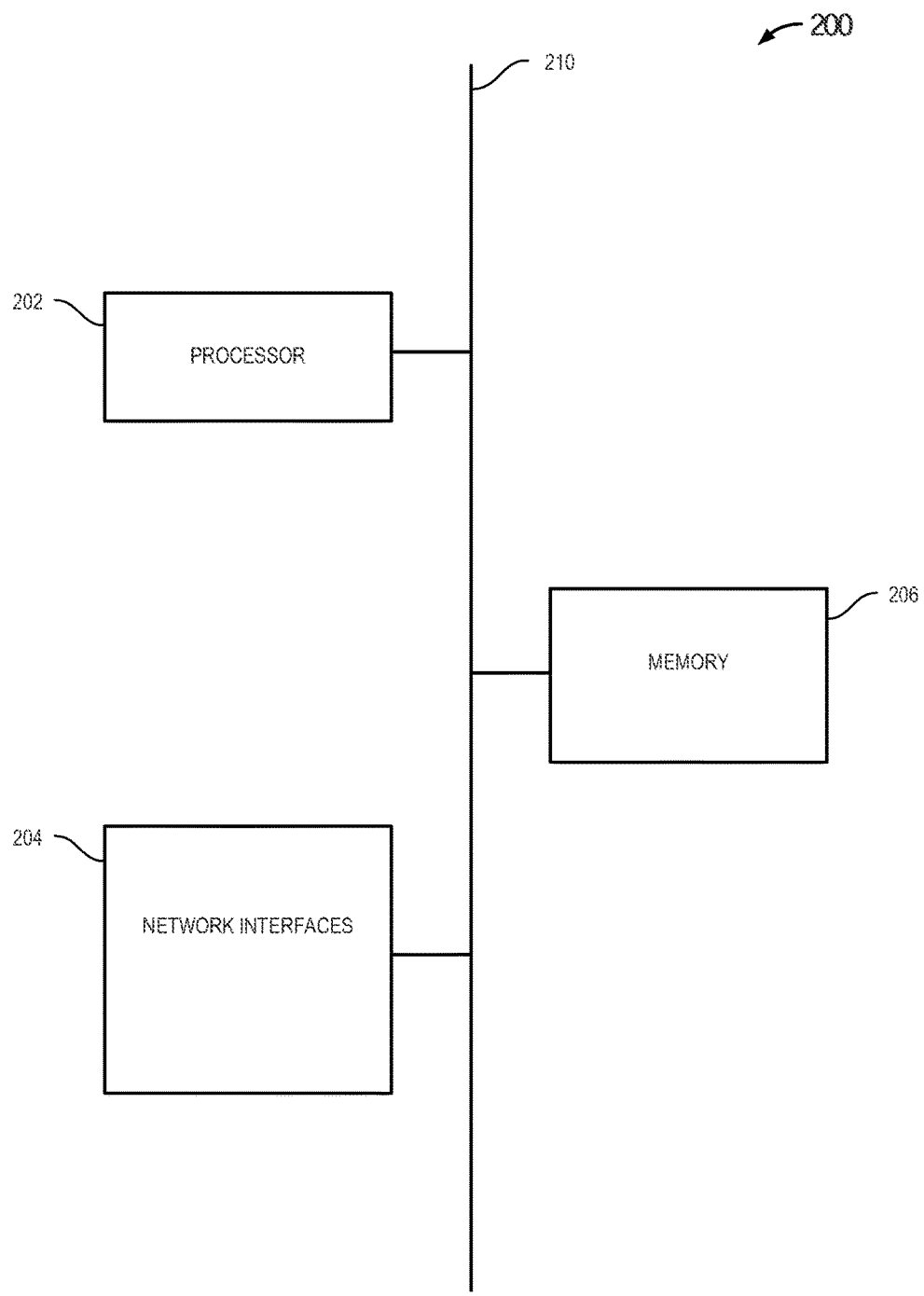
FIG. 2 is a block diagram of an example local transmitter.

FIG. 2 is a block diagram of an example local transmitter 200. In some embodiments, the local transmitter 200 may be a WLAN access points, Bluetooth beacons, or any other device capable of receiving, transmitting, and processing wireless signals in accordance with the discussion herein. The local transmitter 200 provides additional details for the local transmitters 110 in FIG. 1, local transmitters 510 in FIG. 5, and local transmitters 610 in FIG. 6. In some embodiments, the local transmitter 200 can be a standalone WLAN access point configured to communicate over a WLAN communication link with one or more WLAN client devices. The local transmitter 200 includes a processor unit 202 (possibly including multiple processors, multiple cores, multiple nodes, and/or implementing multi-threading, etc.). The local transmitter 200 includes a memory unit 206. The memory unit 206 may be system memory (e.g., one or more non-transitory storage media including cache, SRAM, DRAM, zero capacitor RAM, Twin Transistor RAM, eDRAM, EDO RAM, DDR RAM, EEPROM, NRAM, RRAM, SONOS, PRAM, etc.) or any one or more realizations of machine-readable media. The local transmitter 200 also includes a bus 210 (e.g., PCI, ISA, PCI-Express, HyperTransport®, InfiniBand®, NuBus, AHB, AXI, etc.), and network interface(s) 204 that include at least a WWAN signal receiving module and a positioning beacon signal broadcasting module. These modules may include requisite modems, radios, and antennas, etc. The network interface(s) 204 may also include a wireless network interface (e.g., a WLAN interface, a Bluetooth® interface, a WiMAX interface, a ZigBee® interface, a Wireless USB interface, etc.) and/or a wired network interface (e.g., an Ethernet interface, etc.).

Any one of the functionalities of the local transmitter 200 may be partially (or entirely) implemented in hardware and/or on the processor unit 202. For example, the functionality may be implemented with an application specific integrated circuit, in logic implemented in the processor unit 202, in a co-processor on a peripheral device or card, etc. Further, realizations may include fewer or additional components not illustrated in FIG. 2 (e.g., additional network interfaces, peripheral devices, etc.). The processor unit 202, the memory unit 206, and the network interface(s) 204 are coupled to the bus 210. Although illustrated as being coupled to the bus 210, the memory unit 206 may be coupled to the processor unit 202.

Figure 3:
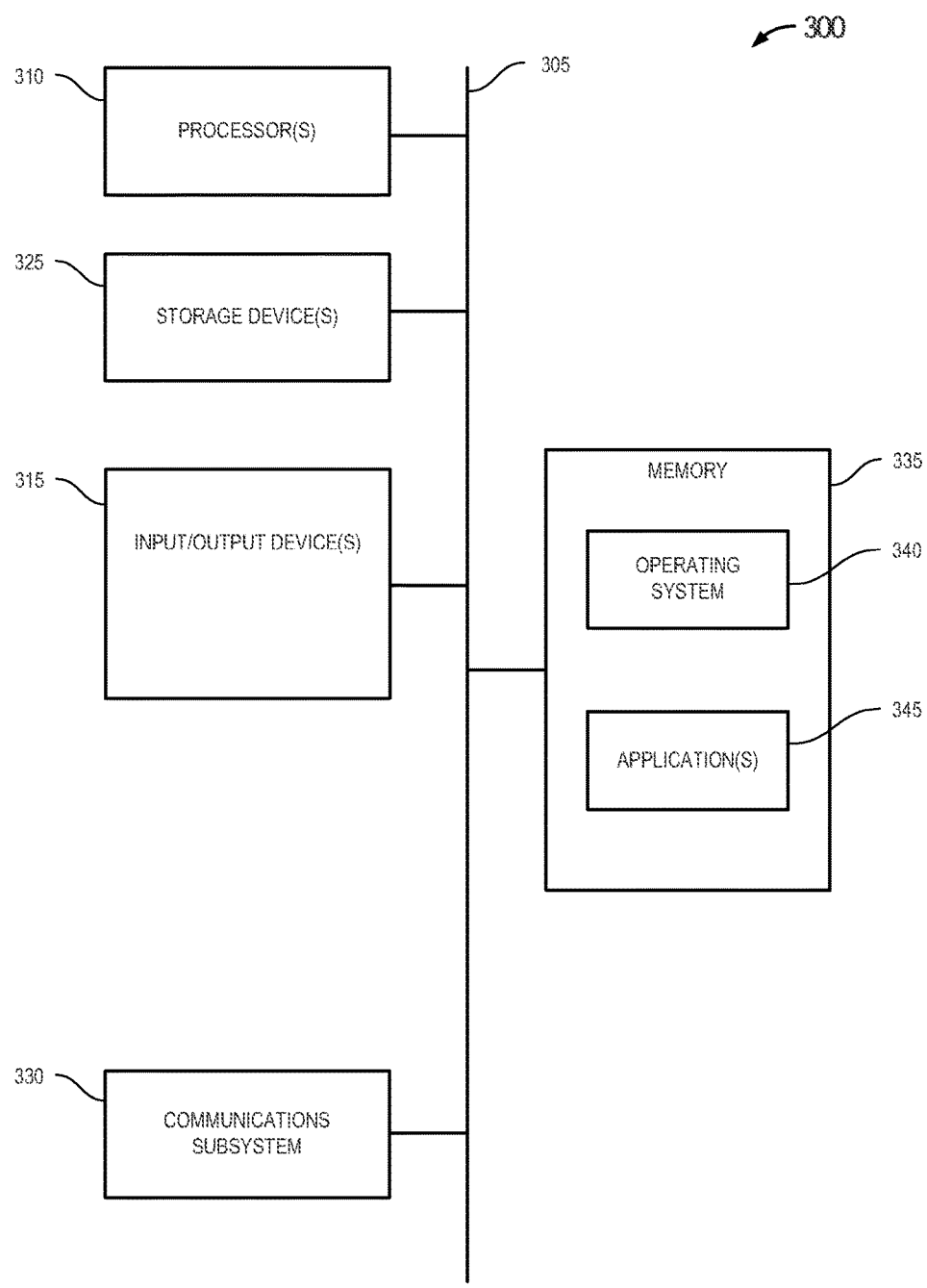
FIG. 3 is a block diagram of an example server.

FIG. 3 is a block diagram of an example server 300. The server 300 may correspond to the server 130 of FIG. 1. The server 300 is shown comprising hardware elements that can be electrically coupled via a bus 305 (or may otherwise be in communication, as appropriate). The hardware elements may include one or more processors 310, including without limitation one or more general-purpose processors and/or one or more special-purpose processors (such as digital signal processing chips, graphics acceleration processors, and/or the like). Server 300 may also include one or more input/output devices 315, such as one or more of a mouse, a keyboard, a speaker, a printer, and/or the like.

The server 300 may further include (and/or be in communication with) one or more non-transitory storage devices 325, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The server 300 might also include a communication subsystem 330, which can include without limitation a modem, a network card (wireless or wired), an infrared communication device, a wireless communication device and/or chipset (such as a Bluetooth device, an 802.11 device, a Wi-Fi device, a WiMAX device, cellular communication facilities, etc.), and/or the like. The communications subsystem 330 may permit data to be exchanged with a network, other computer systems/devices, and/or any other devices described herein. In some embodiments, the server 300 may further comprise a working memory 335, which can include a RAM or ROM device, as described above.

The server 300 also can comprise software elements, shown as being currently located within the working memory 335, including an operating system 340 and one or more application(s) 345, such as device drivers, executable libraries, and/or other code, which may comprise or may be designed to implement methods, and/or configure systems, provided by other embodiments as described herein. Merely by way of example, one or more procedures described with respect to the method(s) discussed below might be implemented as code and/or instructions executable by a computer (and/or a processor within a computer). In such an embodiment, the code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 325 described above. In some cases, the storage medium might be incorporated within a computer device, such as the server 300. In other embodiments, the storage medium might be separate from a computer device (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the server 300 and/or might take the form of source and/or installable code, which, upon compilation and/or installation on the server 300 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In some embodiments, all the local transmitters cannot receive WWAN signals transmitted from a single WWAN base station. For example, a local transmitter may be out of range of a WWAN base station, may be shielded from a particular WWAN base station, etc. In some WWAN networks, WWAN base stations have synchronized clocks and can be referred to as synchronized WWAN networks. With such synchronized WWAN networks, each local transmitter may synchronize its clock to the clock of whichever WWAN base station from which it can receive WWAN signals. All the local transmitters would then have synchronized clocks suitable for TOA-based positioning techniques even though they may have received WWAN signals transmitted from different WWAN base stations. In some embodiments, forward link calibration (FLC) values, where available, may be included in the WWAN signals to help with clock calibration at the local transmitters.

In other WWAN networks, the clocks of the WWAN base stations are not synchronized. With such WWAN networks, local transmitters that are capable of receiving WWAN signals from more than one WWAN base stations may be utilized to measure the clock difference between different WWAN base stations. The clock difference between different WWAN base stations may then be used to keep clocks of all the local transmitters synchronized. The process of deriving the clock difference between WWAN base stations and using the clock difference to synchronize the clocks of local transmitters that receive time from different unsynchronized WWAN base stations may be mediated by a server, such as the server 130 of FIG. 1, server 300 of FIG. 3, or server 700 of FIG. 7.

Figure 4:
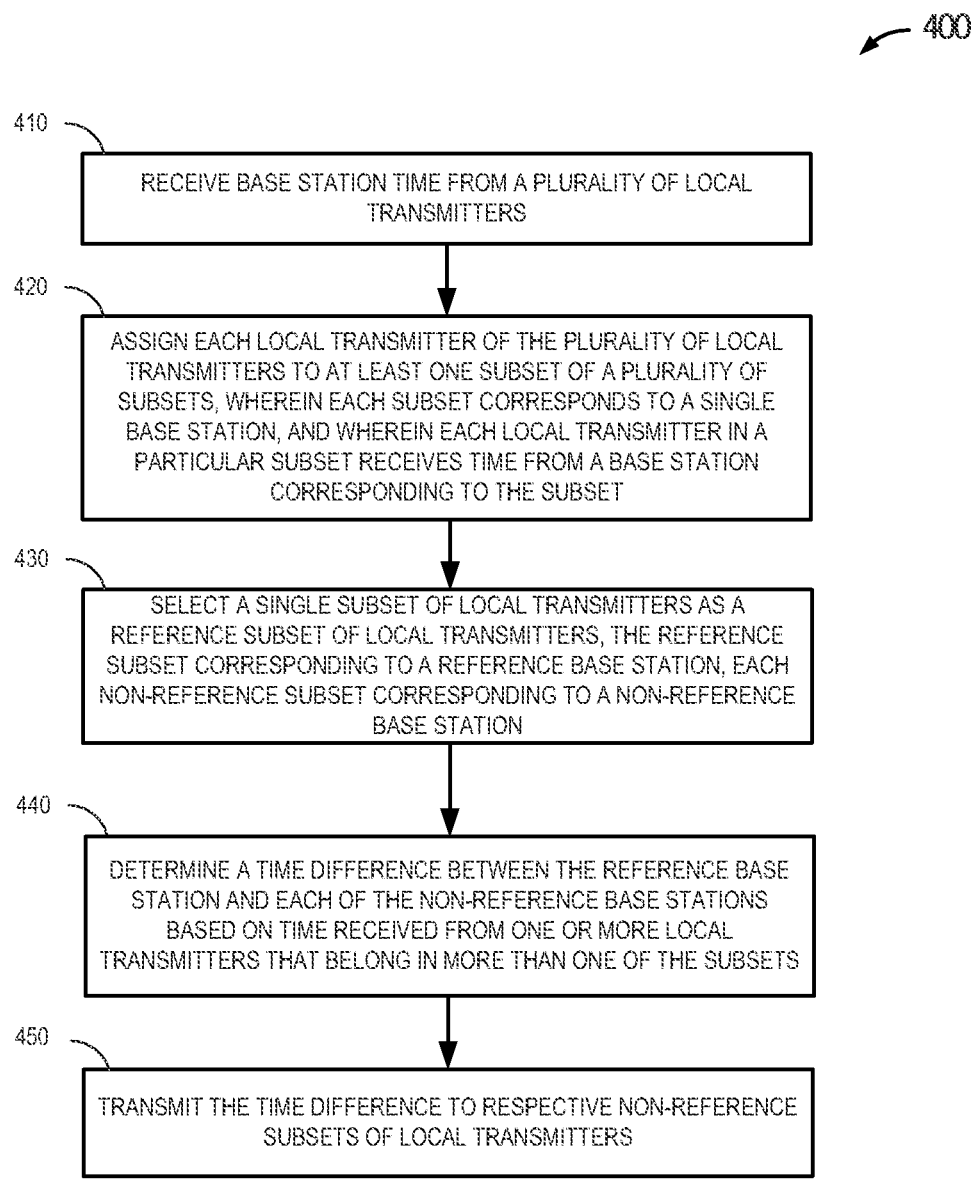
FIG. 4 is a flowchart illustrating an example method for synchronizing clocks of a plurality of local transmitters.

Referring to FIG. 4, a flowchart illustrating an example method 400 for synchronizing clocks of a plurality of local transmitters implemented at a server is shown. The method 400 is performed by processing logic that may comprise hardware (circuitry, dedicated logic, etc.), software (such as is run on a general purpose computer system or a dedicated machine), firmware, or a combination. The method 400 may be performed by, for example, server 130 of FIG. 1, server 300 of FIG. 3, or server 700 of FIG. 7.

At block 410, the server receives base station time from a plurality of local transmitters. The local transmitters may receive the time from WWAN base stations, correct the time for the time of flight, as described above, and transmit the time to the server. The local transmitters may also transmit to the server their identities and of the identities of the WWAN base station from which the time was received. Alternatively, the time of flight may be corrected for by the server based on the location of the WWAN base station and the location of the local transmitter, which may be ascertained based on the identity of the WWAN base station and the identity of the local transmitter. For local transmitters that receive time from more than one WWAN base stations, time from each WWAN base station along with the identity of each base station may be transmitted to the server.

At block 420, the server assigns each local transmitter of the plurality of local transmitters to at least one subset of a plurality of subsets, wherein each subset corresponds to a single base station, and wherein each local transmitter in a particular subset receives time from a base station corresponding to the subset. Each subset may correspond to a single WWAN base station. Furthermore, each local transmitter in a particular subset may receive time from a WWAN base station corresponding to the subset.

At block 430, the server selects a single subset of local transmitters as a reference subset of local transmitters, the reference subset corresponding to a reference base station, each non-reference subset corresponding to a non-reference base station. The WWAN base station corresponding to the reference subset may be referred to as a reference base station, and the WWAN base stations corresponding to non-reference subsets may be referred to as non-reference base stations. In some embodiments, the subset of local transmitters comprising the most local transmitters, such as the subset that has the most local transmitters within range of a single WWAN base station, may be selected as the reference subset of local transmitters. For example, if N local transmitters are within range of a first WWAN base station, M local transmitters are within range of a second WWAN base station, and N>M, then the N local transmitters are selected as the reference subset with the first WWAN base station being the reference base station. This has the beneficial potential of reducing, in some use scenarios, the number of local transmitters that need inter-base station time differences for clock synchronization, as illustrated and discussed below in FIG. 5.

In some other embodiments, the subset of local transmitters that intersects the most other subsets of local transmitters is selected as the reference subset of local transmitters. Two subsets of local transmitters intersect when they share at least one local transmitter. Selecting the reference subset in this way has the beneficial potential of reducing, in some use scenarios, the average distance between the reference subset and each of the non-reference subsets, where the distance can be defined as the smallest number of intermediary intersecting subsets needed to link two subsets (e.g., two intersecting subsets have a distance of 0, two non-intersecting subsets that both intersect a same third subset have a distance of 1, etc.). By selecting the reference subset having the lowest average distance between the reference subset and each of the non-reference subsets, error accumulation can be reduced, as illustrated and discussed below in FIG. 6.

At block 440, the server determines a time difference between the reference base station and each of the non-reference base stations based on time received from one or more local transmitters that belong in more than one of the subsets. A local transmitter that belongs in more than one subset may be referred to as a shared local transmitter. Because the shared local transmitters transmit time received from all WWAN base stations can be provided to the server, the server is capable of determining the time difference between any two base stations that share at least one local transmitter. The time difference between two subsets that do not intersect can also be determined transitively, as long as they are linked through one or more other intermediary intersecting subsets.

At block 450, the server transmits the time difference to respective non-reference subsets of local transmitters. For each non-reference subset of local transmitters, the server may transmit the time difference between the reference subset and the non-reference subset to the non-reference subset of local transmitters. The server may notify the reference subset of local transmitters of the fact that they belong in the reference subset, or may transmit a time difference of 0 to the reference subset of local transmitters. Thereafter, the local transmitters belonging to the reference subset may synchronize their respective clocks based on the time from the reference base station, with or without the server's command. Furthermore, each non-reference subset of local transmitters may synchronize their respective clocks to the clocks of the reference subset of local transmitters, based at least in part on the time from the corresponding non-reference base station and the time difference between the reference base station and the corresponding non-reference base station as received from the server, with or without the server's command. Time of flight correction may be needed in the process of clock synchronization. Thus, all local transmitters are synchronized to the clock of the reference base station, even though not all of them can receive time from the reference base station directly. With the clocks of all local transmitters synchronized, the local transmitters may broadcast positioning beacon signals to be used for TOA-based positioning.

Therefore, one embodiment of the disclosure is related to a server 300 for synchronizing clocks of a plurality of local transmitters, where the server can include a memory 335 and a processor 310 coupled to the memory, as illustrated in FIG. 3. Furthermore, the processor 310 can be configured to perform operations, similar to those discussed above in FIG. 4. In embodiment, the operations can include: receiving base station time from a plurality of local transmitters; assigning the plurality of local transmitters into a plurality of subsets, wherein each subset corresponds to a single base station, and wherein all local transmitters that receive time from a particular base station are assigned to a corresponding subset; selecting a single subset of local transmitters as a reference subset of local transmitters, the reference subset corresponding to a reference base station, each non-reference subset corresponding to a non-reference base station; determining a time difference between the reference base station and each of the non-reference base stations based on time received from one or more local transmitters that belong in more than one of the subsets; and transmitting the time differences to respective non-reference subsets of local transmitters.

Figure 5:
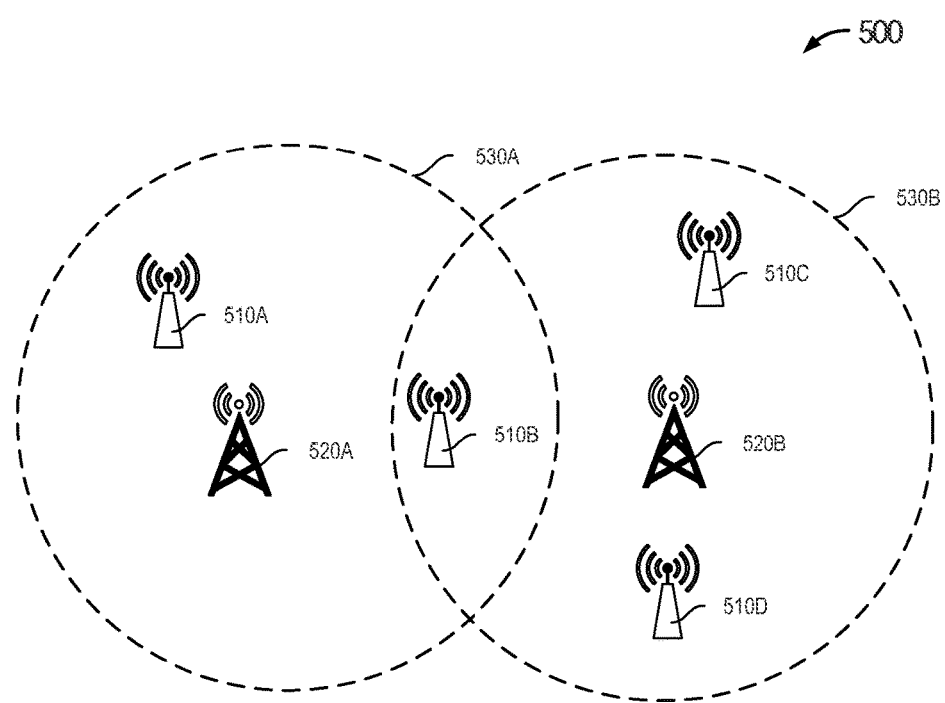
FIG. 5 illustrates an example environment in which embodiments of the disclosure may be practiced.
Figure 6:
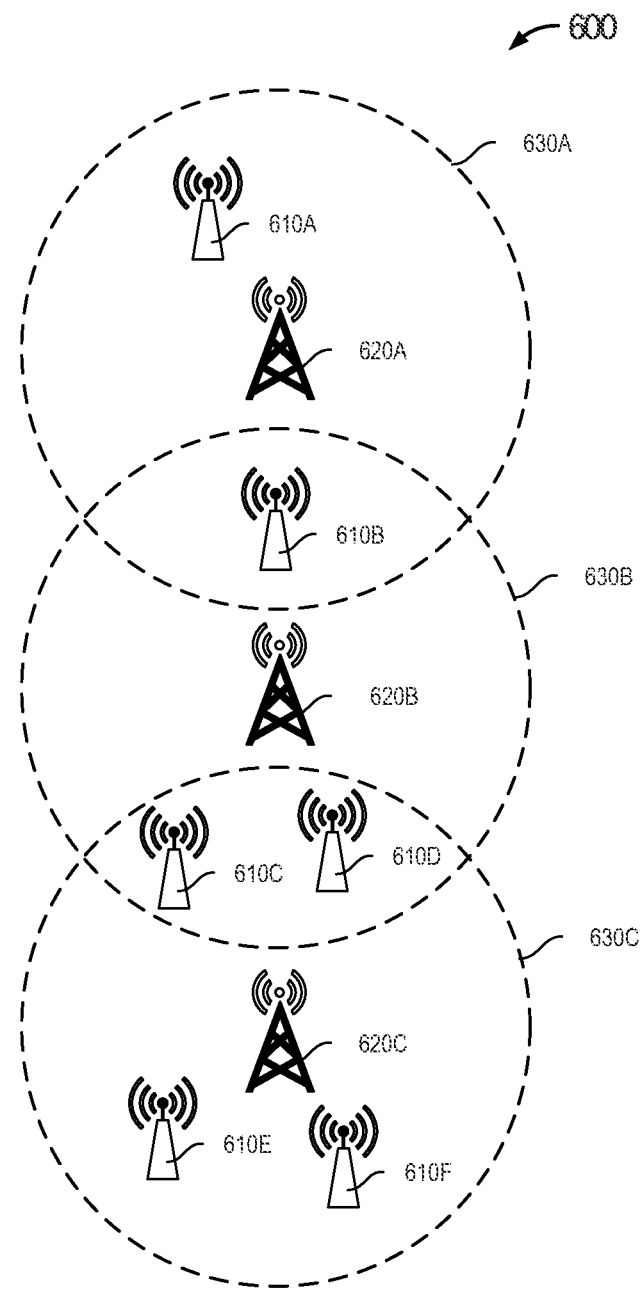
FIG. 6 illustrates an example environment in which embodiments of the disclosure may be practiced.

Referring to FIGS. 5 and 6, example environments 500 and 600 in which embodiments of the disclosure may be practiced are shown. FIGS. 5 and 6 help better illustrate the method 400 of FIG. 4 as described above. A server is not shown in either FIG. 5 or FIG. 6 in order not to obscure the disclosure, but it should be understood that some operations may be performed by a server.

Referring to FIG. 5, as can be seen, all the local transmitters 510A-D cannot receive WWAN signals transmitted by a single WWAN base station because some local transmitters are out of range of particular WWAN base stations. As indicated by the dashed encircling lines, local transmitters 510A and 510B are capable of receiving WWAN signals transmitted by the WWAN base station 520A, while local transmitters 510B-D are capable of receiving WWAN signals transmitted by the WWAN base station 520B. Therefore, a first subset 530A corresponding to the base station 520A comprises local transmitters 510A and 510B, and a second subset 530B corresponding to the base station 520B comprises local transmitters 510B-D. The time difference between the base stations 520A and 520B may be determined using the shared local transmitter 510B. If either subset 530A or 530B is selected as the reference subset, the time difference between the reference base station and the non-reference base station may therefore be determined. In embodiments, where the subset of local transmitters comprising the most local transmitters is selected as the reference subset, the subset 530B may be selected as the reference subset as it comprises more local transmitters than the subset 530A. In this way, only one local transmitter, the local transmitter 510A, needs the inter-base station time difference to synchronize its clock, as opposed to two local transmitters if the subset 530A were selected as the reference subset.

Referring to FIG. 6, similarly, all the local transmitters 610A-F cannot receive WWAN signals transmitted by a single WWAN base station because some local transmitters are out of range of particular WWAN base stations. As indicated by the dashed encircling lines, three subsets 630A-C, corresponding to base stations 620A-C, respectively, are illustrated. The time difference between base stations 620A and 620B may be determined directly using the local transmitter 610B, and the time difference between base stations 620B and 620C may be determined directly using either the local transmitter 610C or the local transmitter 610D. However, as subsets 630A and 630C do not intersect and have a distance of 1, the time difference between the base stations 620A and 620C cannot be directly determined using only one local transmitter. Instead, the time difference can be determined transitively based on the respective time difference between the base station 620B (corresponding to the intermediary subset 630B) and both the base station 620A and the base station 620C.

In embodiments where the subset of local transmitters comprising the most local transmitters is selected as the reference subset, the subset 630C may be selected as the reference subset as it comprises more local transmitters than each of the subsets 630A and 630B. Only two local transmitters, local transmitters 610A and 610B, need inter-base station time differences for clock synchronization with the subset 630C being the reference subset. However, at the same time, the time difference between the base stations 620A and 620C, which can only be determined transitively, would be needed by the local transmitter 610A for clock synchronization.

In embodiments where the subset of local transmitters that intersects the most other subsets of local transmitters is selected as the reference subset of local transmitters, the subset 630B may be selected as the reference subset as it intersects more subsets than each of the remaining subsets 630A and 630C. Three local transmitters, local transmitters 610A, 610E, and 610F, need inter-base station time differences for clock synchronization with the subset 630B being the reference subset. Although more local transmitters would need inter-base station time differences for clock synchronization than if the subset 630C is the reference subset, the transitively determined time difference between the base stations 620A and 620C is not needed and thus can be avoided. Selection of the reference subset in this way may be beneficial as determining time differences transitively has the potential of error accumulation.

Figure 7:
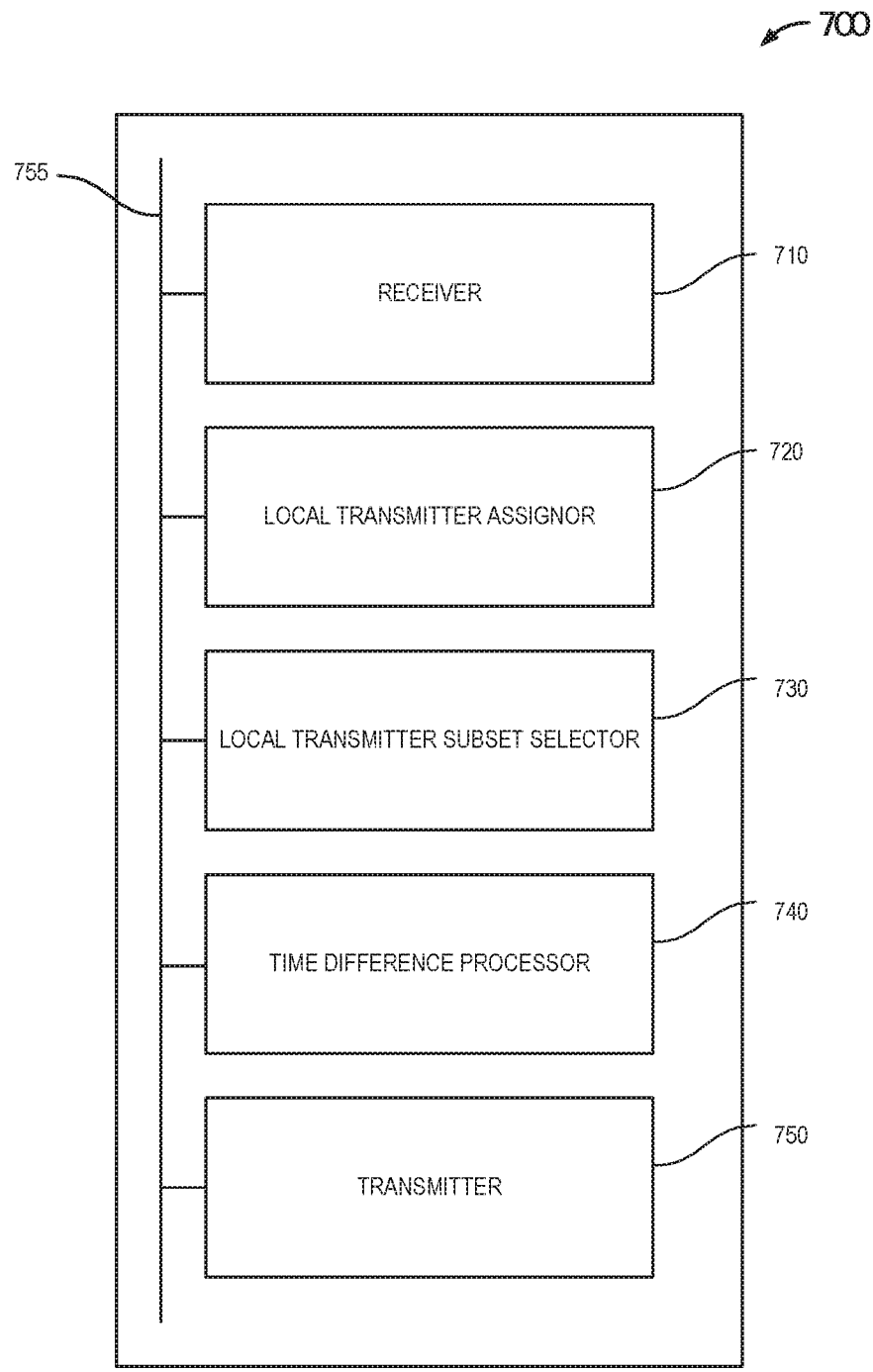
FIG. 7 is a block diagram illustrating an example server with which embodiments of the disclosure may be practiced.

Referring to FIG. 7, a block diagram illustrating an example server 700 with which embodiments of the disclosure may be practiced is shown. In one embodiment, server 700 provides additional details for the server discussed above in FIG. 3. In one embodiment, server 700 includes a receiver 710 and a transmitter 750. Furthermore, server 700 can include a number of processing modules, which may be implemented as hardware, software, firmware, or a combination, such as local transmitter assignor 720, local transmitter subset selector 730, time difference processor 740, and which are responsible for performing one or more of the operations discussed above in FIG. 4. Additionally, server 700 can include one or more processors, storage devices, input/output devices, memory, and a communications subsystem, as discussed above in FIG. 3. In embodiments, the components of server 700 are electrically and/or communicably coupled to bus 755.

In one embodiment, receiver 710 may receive base station time from a plurality of local transmitters. In one embodiment, receiver 710 may be part of a communications subsystem, such as communication subsystem 330 discussed above.

Local transmitter assignor 720 may assign each local transmitter of the plurality of local transmitters to at least one subset of a plurality of subsets. As discussed above, local transmitters can be assigned to one or more subsets based on which base station(s) the local transmitters are in range of. In one embodiment, each subset corresponds to a single base station, and each local transmitter in a particular subset receives time from a base station corresponding to the subset.

Local transmitter subset selector 730 may select a single subset of local transmitters as a reference subset of local transmitters. In one embodiment, the reference subset corresponds to a reference base station, and each non-reference subset corresponds to a non-reference base station. Time difference processor 740 may then determine a time difference between the reference base station and each of the non-reference base stations based on time received from one or more local transmitters that belong in more than one of the subsets.

In one embodiment, after time difference processor 740 has determined the time differences, transmitter 750 may transmit the time differences to respective non-reference subsets of local transmitters. In one embodiment, transmitter 750 may also be part of a communications subsystem, such as communication subsystem 330 discussed above.

Therefore, by utilizing embodiments of the disclosure described herein, local transmitters, such as WLAN access points, Bluetooth beacons, or a combination of local transmitters, may synchronize their clocks based on WWAN signals and then broadcast positioning beacon signals. Scalable TOA-based positioning may be performed based on these positioning beacon signals to determine the position of a receiver device, such as a mobile device.

It should be appreciated that the method for synchronizing the clocks of a plurality of local transmitters based on WWAN signals, as previously described, may be implemented as software, firmware, hardware, combinations thereof, etc. In one embodiment, the previous described functions may be implemented by one or more processors (e.g., processor 310) of a server 300 to achieve the previously desired functions (e.g., the method operations of FIG. 4).

The teachings herein may be incorporated into (e.g., implemented within or performed by) a variety of apparatuses (e.g., devices). For example, one or more aspects taught herein may be incorporated into a general device, a desktop computer, a mobile computer, a mobile device, a phone (e.g., a cellular phone), a personal data assistant, a tablet, a laptop computer, a tablet, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a server, a point-of-sale device, an entertainment device, a set-top box, a wearable device (e.g., watch, head mounted display, virtual reality glasses, etc.), an electronic device within an automobile, or any other suitable device.

In some aspects a wireless device may comprise an access device (e.g., a WLAN access point) for a communication system. Such an access device may provide, for example, connectivity to another network through transceiver (e.g., a wide area network such as the Internet or a cellular network) via a wired or wireless communication link. Accordingly, the access device may enable another device (e.g., a WLAN station) to access the other network or some other functionality. In addition, it should be appreciated that one or both of the devices may be portable or, in some cases, relatively non-portable.

It should be appreciated that when the devices are mobile or wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and WLAN. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more example embodiments, the functions described may be implemented in hardware, software, firmware, or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for synchronizing clocks of a plurality of local transmitters implemented at a server, comprising:
   receiving base station time from a plurality of local transmitters;
   assigning each local transmitter of the plurality of local transmitters to at least one subset of a plurality of subsets, wherein each subset corresponds to a single base station, and wherein each local transmitter in a particular subset receives time from a base station corresponding to the subset;
   selecting a single subset of local transmitters as a reference subset of local transmitters, the reference subset corresponding to a reference base station, each non-reference subset corresponding to a non-reference base station;
   determining a time difference between the reference base station and each of the non-reference base stations based on time received from one or more local transmitters that belong in more than one of the subsets; and
   transmitting the time difference to respective non-reference subsets of local transmitters, wherein at least one local transmitter from a non-reference subset of local transmitters that does not receive base station time from the reference base station synchronizes a clock of the at least one local transmitter with the reference base station time based on the time difference and a received non-reference base station time.

2. The method of claim 1, wherein a time difference between the reference base station and a first non-reference base station corresponds to a first non-reference subset of local transmitters that intersects the reference subset of local transmitters is determined based on time received from a local transmitter that belongs in both the reference subset of local transmitters and the first non-reference subset of local transmitters.

3. The method of claim 2, wherein a time difference between the reference base station and a second non-reference base station corresponds to a second non-reference subset of local transmitters that intersects the first non-reference subset of local transmitters but does not intersect the reference subset of local transmitters is determined based on time received from a local transmitter that belongs in both the first subset of local transmitters and the second subset of local transmitters and the time difference between the reference base station and the first non-reference base station.

4. The method of claim 1, further comprising:
   transmitting an instruction to cause the reference subset of local transmitters to synchronize their respective clocks based on a time from the reference base station; and
   transmitting an instruction to cause each of the non-reference subsets of local transmitters to synchronize their respective clocks to the clocks of the reference subset of local transmitters based on a time from the corresponding non-reference base station and the time difference between the reference base station and the corresponding non-reference base station.

5. The method of claim 4, wherein the synchronization of a clock of a local transmitter of the plurality of local transmitters comprises one of correcting a clock offset, correcting a frequency offset, or any combination thereof.

6. The method of claim 4, wherein the synchronization of a clock of a local transmitter of the plurality of local transmitters assigned to a non-reference base station is further based on a propagation time, for a base station time transmitted by the non-reference base station, corresponding to travel of the base station time over a distance between the non-reference base station and the local transmitter, wherein the distance between the non-reference base station and the local transmitter is determined based on a position of the local transmitter and a position of the non-reference base station.

7. The method of claim 1, wherein one of the plurality of subsets of local transmitters comprising a largest number of local transmitters is selected as the reference subset of local transmitters.

8. The method of claim 1, wherein one of the plurality of subsets of local transmitters that intersects a largest number of other subsets of local transmitters is selected as the reference subset of local transmitters, wherein any two subsets of local transmitters intersect when the two subsets share at least one local transmitter.

9. The method of claim 1, wherein at least one of the plurality of local transmitters comprises a WLAN access point, a Bluetooth beacon, or a combination thereof.

10. The method of claim 1, wherein at least one of the base stations is one of a Global System for Mobile Communications (GSM) base station, a Code Division Multiple Access (CDMA) base station, a Universal Mobile Telecommunications System (UMTS) base station, a CDMA2000 base station, a Long-Term Evolution (LTE) base station, or an LTE Advanced base station.

11. A server for synchronizing clocks of a plurality of local transmitters, comprising:
 a memory; and
 a processor coupled to the memory, the processor being configured to:
  receive base station time from a plurality of local transmitters,
  assign each local transmitter of the plurality of local transmitters to at least one subset of a plurality of subsets, wherein each subset corresponds to a single base station, and wherein each local transmitter in a particular subset receives time from a base station corresponding to the subset,
  select a single subset of local transmitters as a reference subset of local transmitters, the reference subset corresponding to a reference base station, each non-reference subset corresponding to a non-reference base station,
  determine a time difference between the reference base station and each of the non-reference base stations based on time received from one or more local transmitters that belong in more than one of the subsets, and
  transmit the time difference to respective non-reference subsets of local transmitters, wherein at least one local transmitter from a non-reference subset of local transmitters that does not receive base station time from the reference base station synchronizes a clock of the at least one local transmitter with the reference base station time based on the time difference and a received non-reference base station time.

12. The server of claim 11, wherein a time difference between the reference base station and a first non-reference base station corresponds to a first non-reference subset of local transmitters that intersects the reference subset of local transmitters is determined based on time received from a local transmitter that belongs in both the reference subset of local transmitters and the first non-reference subset of local transmitters.

13. The server of claim 12, wherein a time difference between the reference base station and a second non-reference base station corresponds to a second non-reference subset of local transmitters that intersects the first non-reference subset of local transmitters but does not intersect the reference subset of local transmitters is determined based on time received from a local transmitter that belongs in both the first subset of local transmitters and the second subset of local transmitters and the time difference between the reference base station and the first non-reference base station.

14. The server of claim 11, wherein the processor is further configured to:
 transmit an instruction to cause the reference subset of local transmitters to synchronize their respective clocks based on a time from the reference base station; and
 transmit an instruction to cause each of the non-reference subsets of local transmitters to synchronize their respective clocks to the clocks of the reference subset of local transmitters based on a time from the corresponding non-reference base station and the time difference between the reference base station and the corresponding non-reference base station.

15. The server of claim 14, wherein the synchronization of a clock of a local transmitter of the plurality of local transmitters comprises one of correcting a clock offset, correcting a frequency offset, or any combination thereof.

16. The server of claim 14, wherein the synchronization of a clock of a local transmitter of the plurality of local transmitters assigned to a non-reference base station is further based on a propagation time, for a base station time transmitted by the non-reference base station, corresponding to travel of the base station time over a distance between the non-reference base station and the local transmitter, wherein the distance between the non-reference base station and the local transmitter is determined based on a position of the local transmitter and a position of the non-reference base station.

17. The server of claim 11, wherein one of the plurality of subsets of local transmitters comprising a largest number of local transmitters is selected as the reference subset of local transmitters.

18. The server of claim 11, wherein one of the plurality of subsets of local transmitters that intersects a largest number of other subsets of local transmitters is selected as the reference subset of local transmitters, wherein any two subsets of local transmitters intersect when the two subsets share at least one local transmitter.

19. The server of claim 11, wherein at least one of the plurality of local transmitters comprises a WLAN access point, a Bluetooth beacon, or a combination thereof.

20. The server of claim 11, wherein at least one of the base stations is one of a Global System for Mobile Communications (GSM) base station, a Code Division Multiple Access (CDMA) base station, a Universal Mobile Telecommunications System (UMTS) base station, a CDMA2000 base station, a Long-Term Evolution (LTE) base station, or an LTE Advanced base station.

21. A server for synchronizing clocks of a plurality of local transmitters, comprising:
 processor means for receiving base station time from a plurality of local transmitters;

processor means for assigning each local transmitter of the plurality of local transmitters to at least one subset of a plurality of subsets, wherein each subset corresponds to a single base station, and wherein each local transmitter in a particular subset receives time from a base station corresponding to the subset processor means for selecting a single subset of local transmitters as a reference subset of local transmitters, the reference subset corresponding to a reference base station, each non-reference subset corresponding to a non-reference base station;

processor means for determining a time difference between the reference base station and each of the non-reference base stations based on time received from one or more local transmitters that belong in more than one of the subsets; and processor means for transmitting the time difference to respective non-reference subsets of local transmitters, wherein at least one local transmitter from a non-reference subset of local transmitters that does not receive base station time from the reference base station synchronizes a clock of the at least one local transmitter with the reference base station time based on the time difference and a received non-reference base station time.

22. The server of claim 21, wherein a time difference between the reference base station and a first non-reference base station corresponds to a first non-reference subset of local transmitters that intersects the reference subset of local transmitters is determined based on time received from a local transmitter that belongs in both the reference subset of local transmitters and the first non-reference subset of local transmitters.

23. The server of claim 21, further comprising:
processor means for transmitting an instruction to cause the reference subset of local transmitters to synchronize their respective clocks based on a time from the reference base station; and
processor means for transmitting an instruction to cause each of the non-reference subsets of local transmitters to synchronize their respective clocks to the clocks of the reference subset of local transmitters based on a time from the corresponding non-reference base station and the time difference between the reference base station and the corresponding non-reference base station.

24. The server of claim 23, wherein the synchronization of a clock of a local transmitter of the plurality of local transmitters comprises one of correcting a clock offset, correcting a frequency offset, or any combination thereof.

25. The server of claim 23, wherein the synchronization of a clock of a local transmitter of the plurality of local transmitters assigned to a non-reference base station is further based on a propagation time, for a base station time transmitted by the non-reference base station, corresponding to travel of the base station time over a distance between the non-reference base station and the local transmitter, wherein the distance between the non-reference base station and the local transmitter is determined based on a position of the local transmitter and a position of the non-reference base station.

26. A non-transitory, computer-readable, storage medium storing computer executable code for synchronizing clocks of a plurality of local transmitters, which when executed by a computing system, causes the computing system to perform a method, comprising:

receiving base station time from a plurality of local transmitters;

assigning each local transmitter of the plurality of local transmitters to at least one subset of a plurality of subsets, wherein each subset corresponds to a single base station, and wherein each local transmitter in a particular subset receives time from a base station corresponding to the subset selecting a single subset of local transmitters as a reference subset of local transmitters, the reference subset corresponding to a reference base station, each non-reference subset corresponding to a non-reference base station;

determining a time difference between the reference base station and each of the non-reference base stations based on time received from one or more local transmitters that belong in more than one of the subsets; and transmitting the time difference to respective non-reference subsets of local transmitters, wherein at least one local transmitter from a non-reference subset of local transmitters that does not receive base station time from the reference base station synchronizes a clock of the at least one local transmitter with the reference base station time based on the time difference and a received non-reference base station time.

27. The non-transitory, computer-readable, storage medium of claim 26, wherein a time difference between the reference base station and a first non-reference base station corresponds to a first non-reference subset of local transmitters that intersects the reference subset of local transmitters is determined based on time received from a local transmitter that belongs in both the reference subset of local transmitters and the first non-reference subset of local transmitters.

28. The non-transitory, computer-readable, storage medium of claim 26, further comprising computer executable code for:
transmitting an instruction to cause the reference subset of local transmitters to synchronize their respective clocks based on a time from the reference base station; and
transmitting an instruction to cause each of the non-reference subsets of local transmitters to synchronize their respective clocks to the clocks of the reference subset of local transmitters based on a time from the corresponding non-reference base station and the time difference between the reference base station and the corresponding non-reference base station.

29. The non-transitory, computer-readable, storage medium of claim 28, wherein the synchronization of a clock of a local transmitter of the plurality of local transmitters comprises one of correcting a clock offset, correcting a frequency offset, or any combination thereof.

30. The non-transitory, computer-readable, storage medium of claim 28, wherein the synchronization of a clock of a local transmitter of the plurality of local transmitters assigned to a non-reference base station is further based on a propagation time, for a base station time transmitted by the non-reference base station, corresponding to travel of the base station time over a distance between the non-reference base station and the local transmitter, wherein the distance between the non-reference base station and the local transmitter is determined based on a position of the local transmitter and a position of the non-reference base station.

* * * * *